United States Patent
Caputo

(10) Patent No.: US 9,104,621 B1
(45) Date of Patent: Aug. 11, 2015

(54) SYSTEMS AND METHODS FOR RESTORING A FILE

(71) Applicant: Axcient, Inc., Mountain View, CA (US)

(72) Inventor: Vito Caputo, Wheaton, IL (US)

(73) Assignee: Axcient, Inc., Mountain View, CA (US)

( * ) Notice: Subject to any disclaimer, the term of this patent is extended or adjusted under 35 U.S.C. 154(b) by 0 days.

(21) Appl. No.: 14/534,017

(22) Filed: Nov. 5, 2014

Related U.S. Application Data

(63) Continuation of application No. 12/895,275, filed on Sep. 30, 2010, now Pat. No. 8,924,360.

(51) Int. Cl.
   G06F 17/00      (2006.01)
   G06F 7/00       (2006.01)
   G06F 11/14      (2006.01)
   G06F 17/30      (2006.01)

(52) U.S. Cl.
   CPC ...... *G06F 11/1448* (2013.01); *G06F 17/30088* (2013.01)

(58) Field of Classification Search
   CPC .................. G06F 11/1448; G06F 17/30088
   USPC .................................................. 707/684, 685
   See application file for complete search history.

(56) References Cited

U.S. PATENT DOCUMENTS

| | | |
|---|---|---|
| 5,574,905 A | 11/1996 | deCarmo |
| 6,233,589 B1 | 5/2001 | Balcha et al. |
| 6,411,985 B1 | 6/2002 | Fujita et al. |
| 6,604,236 B1 | 8/2003 | Draper et al. |
| 6,629,110 B2 | 9/2003 | Cane et al. |
| 6,651,075 B1 | 11/2003 | Kusters et al. |
| 6,971,018 B1 | 11/2005 | Witt et al. |
| 7,085,904 B2 | 8/2006 | Mizuno et al. |
| 7,266,655 B1 | 9/2007 | Escabi, II et al. |
| 7,401,192 B2 | 7/2008 | Stakutis et al. |
| 7,406,488 B2 | 7/2008 | Stager et al. |
| 7,546,323 B1 | 6/2009 | Timmins et al. |
| 7,620,765 B1 | 11/2009 | Ohr et al. |
| 7,647,338 B2 | 1/2010 | Lazier et al. |
| 7,676,763 B2 | 3/2010 | Rummel |
| 7,730,425 B2 | 6/2010 | de los Reyes et al. |
| 7,743,038 B1 | 6/2010 | Goldick |
| 7,752,487 B1 | 7/2010 | Feeser et al. |
| 7,769,731 B2 | 8/2010 | O'Brien |
| 7,797,582 B1 | 9/2010 | Stager et al. |
| 7,809,688 B2 | 10/2010 | Cisler et al. |
| 7,832,008 B1 | 11/2010 | Kraemer |
| 7,844,850 B2 | 11/2010 | Yasuzato |
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1 | 11/2011 | Afonso et al. |
| 8,099,391 B1 | 1/2012 | Monckton |
| 8,099,572 B1 | 1/2012 | Arora et al. |
| 8,117,163 B2 | 2/2012 | Brown et al. |

(Continued)

*Primary Examiner* — Kannan Shanmugasundaram
(74) *Attorney, Agent, or Firm* — Carr & Ferrell LLP

(57) ABSTRACT

Systems and methods for restoring files and metadata records associated with files are provided herein. Some of the methods include identifying a version of the file, evaluating one or more reverse incremental delta increments, and restoring an arbitrary version of the file based on an arbitrary time reference by assembling the arbitrary version of the file based on the one or more reverse incremental delta increments.

20 Claims, 7 Drawing Sheets

(56) References Cited

U.S. PATENT DOCUMENTS

| | | |
|---|---|---|
| 8,200,926 B1 | 6/2012 | Stringham |
| 8,224,935 B1 | 7/2012 | Bandopadhyay et al. |
| 8,244,914 B1 | 8/2012 | Nagarkar |
| 8,245,156 B2 | 8/2012 | Mouilleseaux et al. |
| 8,260,742 B2 | 9/2012 | Cognigni et al. |
| 8,279,174 B2 | 10/2012 | Jee et al. |
| 8,296,410 B1 | 10/2012 | Myhill et al. |
| 8,321,688 B2 | 11/2012 | Auradkar et al. |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 | 3/2013 | O'Shea et al. |
| 8,407,190 B2 | 3/2013 | Prahlad et al. |
| 8,412,680 B1 | 4/2013 | Gokhale et al. |
| 8,549,432 B2 | 10/2013 | Warner |
| 8,572,337 B1 | 10/2013 | Gokhale et al. |
| 8,589,350 B1 | 11/2013 | Lalonde et al. |
| 8,589,913 B2 | 11/2013 | Jelvis et al. |
| 8,600,947 B1 | 12/2013 | Freiheit et al. |
| 8,601,389 B2 | 12/2013 | Schulz et al. |
| 8,606,752 B1 | 12/2013 | Beatty et al. |
| 8,639,917 B1 | 1/2014 | Ben-Shaul et al. |
| 8,676,273 B1 | 3/2014 | Fujisaki |
| 8,886,611 B2 | 11/2014 | Caputo |
| 8,924,360 B1 | 12/2014 | Caputo |
| 8,954,544 B2 | 2/2015 | Edwards |
| 2001/0056503 A1 | 12/2001 | Hibbard |
| 2002/0169740 A1 | 11/2002 | Korn |
| 2003/0011638 A1 | 1/2003 | Chung |
| 2003/0158873 A1 | 8/2003 | Sawdon et al. |
| 2003/0208492 A1 | 11/2003 | Winiger et al. |
| 2004/0044707 A1 | 3/2004 | Richard |
| 2004/0073560 A1 | 4/2004 | Edwards |
| 2004/0093474 A1 | 5/2004 | Lin et al. |
| 2004/0233924 A1 | 11/2004 | Bilak et al. |
| 2004/0260973 A1 | 12/2004 | Michelman |
| 2005/0010835 A1 | 1/2005 | Childs et al. |
| 2005/0027748 A1 | 2/2005 | Kisley |
| 2005/0171979 A1 | 8/2005 | Stager et al. |
| 2005/0223043 A1 | 10/2005 | Randal et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0112895 A1 | 5/2007 | Ahrens et al. |
| 2007/0176898 A1 | 8/2007 | Suh |
| 2007/0204166 A1 | 8/2007 | Tome et al. |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0260842 A1 | 11/2007 | Faibish et al. |
| 2007/0276916 A1 | 11/2007 | McLoughlin et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1 | 1/2008 | Faibish et al. |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorfi et al. |
| 2008/0141018 A1 | 6/2008 | Tanaka et al. |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1 | 9/2008 | Tillgren |
| 2008/0307527 A1 | 12/2008 | Kaczmarski et al. |
| 2009/0164527 A1 | 6/2009 | Spektor et al. |
| 2009/0185500 A1 | 7/2009 | Mower et al. |
| 2009/0216973 A1 | 8/2009 | Nakajima et al. |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0077165 A1 | 3/2010 | Lu et al. |
| 2010/0104105 A1 | 4/2010 | Schmidt et al. |
| 2010/0107155 A1 | 4/2010 | Banerjee et al. |
| 2010/0114832 A1 | 5/2010 | Lillibridge et al. |
| 2010/0165947 A1 | 7/2010 | Taniuchi et al. |
| 2010/0179973 A1 | 7/2010 | Carruzzo |
| 2010/0192103 A1 | 7/2010 | Cragun et al. |
| 2010/0205152 A1 | 8/2010 | Ansari et al. |
| 2010/0228999 A1 | 9/2010 | Maheshwari et al. |
| 2010/0235831 A1 | 9/2010 | Dittmer |
| 2010/0268689 A1 | 10/2010 | Gates et al. |
| 2010/0318748 A1 | 12/2010 | Ko et al. |
| 2011/0041004 A1 | 2/2011 | Miwa et al. |
| 2011/0047405 A1 | 2/2011 | Marowsky-Bree et al. |
| 2011/0055399 A1 | 3/2011 | Tung et al. |
| 2011/0055471 A1 | 3/2011 | Thatcher et al. |
| 2011/0055500 A1 | 3/2011 | Sasson et al. |
| 2011/0082998 A1 | 4/2011 | Boldy et al. |
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0265143 A1 | 10/2011 | Grube et al. |
| 2012/0013540 A1 | 1/2012 | Hogan |
| 2012/0065802 A1 | 3/2012 | Seeber et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2013/0091183 A1 | 4/2013 | Edwards et al. |
| 2013/0091471 A1 | 4/2013 | Gutt et al. |
| 2013/0166511 A1 | 6/2013 | Ghatty et al. |
| 2013/0238752 A1 | 9/2013 | Park et al. |
| 2013/0318046 A1 | 11/2013 | Clifford et al. |
| 2014/0006858 A1 | 1/2014 | Helfman et al. |
| 2014/0032498 A1 | 1/2014 | Lalonde et al. |
| 2014/0047081 A1 | 2/2014 | Edwards |
| 2014/0053022 A1 | 2/2014 | Forgette et al. |
| 2014/0089619 A1 | 3/2014 | Khanna et al. |
| 2014/0189680 A1 | 7/2014 | Kripalani |
| 2014/0303961 A1 | 10/2014 | Leydon et al. |
| 2015/0046404 A1 | 2/2015 | Caputo |
| 2015/0095691 A1 | 4/2015 | Edwards |

SYSTEMS AND METHODS FOR RESTORING A FILE

CROSS-REFERENCE TO RELATED APPLICATIONS

This application is a continuation of, and claims the benefit of, U.S. patent application Ser. No. 12/895,275, filed Sep. 30, 2010, entitled "Systems and Methods for Restoring a File," now issued as U.S. Pat. No. 8,924,360 on Dec. 30, 2014, which is incorporated by reference herein in its entirety, including all references cited therein.

FIELD OF THE INVENTION

The present invention relates generally to systems and methods for restoring a file, and more specifically, but not by way of limitation, to systems and methods adapted to utilize the offsets and lengths of inherited and copy blocks of reverse incremental delta increments to restore a file to an arbitrary time reference. Additionally, the present invention relates to systems and methods adapted to restore metadata files associated with one or more files to be restored.

BACKGROUND

Systems and methods for backing up and restoring individual or multiple files are well known in the art. While these systems and methods are well known, they suffer from numerous drawbacks.

As background, backups may be created for individual files or for entire volumes, or disks of a computing system. These backups contain all blocks of data corresponding to the file at a given point in time and are stored either locally or remotely in a data repository.

One of ordinary skill will appreciate that due to cost and data storage limitations, it is not practical to create full backups of files or disks on a regular basis (e.g., hourly or daily). Therefore, systems and methods have been developed to utilize full backups in conjunction with incremental delta files, which include information indicative of blocks of data that have changed relative to the last backup. Unfortunately, these systems and methods are replete with drawbacks. For example, to restore a file to an arbitrary time reference, an iterative process must be utilized that is both time-consuming and inefficient. More specifically, starting with the most recent backup and a previous incremental delta file, an intermediate file must be created and stored in temporary space that includes all of the blocks of data present in the backup plus changed data included in the incremental delta file. If another incremental delta file exists between the intermediate file and the desired version of the file to be restored a second intermediate file must be created and temporarily stored. This process continues until all pertinent incremental delta files have been processed to restore the file to the arbitrary time reference.

Therefore, it is an object of the present invention to provide systems and methods that reduce and/or eliminate the aforementioned drawbacks associated with presently available systems and methods for backing up and restoring files.

These and other objects of the present invention will become apparent in light of the present specification, claims, and drawings.

SUMMARY OF THE INVENTION

According to exemplary embodiments, the present invention provides for a method for restoring a file that includes identifying a version of the file, evaluating one or more reverse incremental delta increments, the one or more reverse incremental delta increments associated with the identified version of the file, the one or more reverse incremental delta increments being temporally adjacent to an arbitrary time reference, the one or more reverse incremental delta increments including blocks of data comprising literal blocks and inherited blocks, the inherited blocks comprising metadata corresponding to at least one of an offset and a length of a block to be inherited, and restoring an arbitrary version of the file based on an arbitrary time reference by assembling the arbitrary version of the file based on the one or more reverse incremental delta increments through utilization of the offsets and lengths of the inherited blocks of data.

According to additional exemplary embodiments, the present invention provides for a method for restoring a metadata record from differential metadata that includes identifying a metadata snapshot associated with the metadata record, the metadata snapshot including plurality of nodes corresponding to metadata, establishing a time sequence spanning between an arbitrary time reference and a time reference of the metadata snapshot, locating differential metadata created during the time sequence, the differential metadata including nodes corresponding to changes in the metadata and empty nodes corresponding to metadata inherited from temporally adjacent differential metadata, parsing the metadata snapshot to determine the nodes and create an index for the metadata record to be restored, opening the one or more differential metadata, inheriting the nodes of the metadata snapshot, utilizing the index, in reverse chronological order relative to the nodes of the one or more differential metadata to determine changes between the metadata snapshot and the metadata record to be restored, and restoring a metadata record to the arbitrary time reference utilizing the determined changes.

According to additional exemplary embodiments, the present invention provides a system for restoring a file that includes a network coupled to a server, the server including (a) a file locator module for identifying a version of the file and one or more reverse incremental delta increments, (b) a parsing module for evaluating the one or more reverse incremental delta increments, the one or more reverse incremental delta increments associated with the located version of the file, the one or more reverse incremental delta increments being temporally adjacent to an arbitrary time reference, the one or more reverse incremental delta increments including blocks of data comprising literal blocks and inherited blocks, the inherited blocks comprising metadata corresponding to an offset or a length of a block to be inherited, and (c) a restoration engine for restoring the arbitrary version of the file based on the arbitrary time reference by assembling the arbitrary version of the file based on the one or more reverse incremental delta increments through utilization of the offsets and lengths of the inherited blocks of data.

According to additional exemplary embodiments, the present invention provides a system for restoring a metadata record from differential metadata, the system including a network coupled to a server, the server including (a) a file locator module adapted to identify a metadata snapshot associated with the metadata record, the metadata snapshot including plurality of nodes corresponding to metadata, establish a time sequence spanning between an arbitrary time reference and a time reference corresponding to the metadata snapshot, and locate differential metadata created during the time sequence, the differential metadata including nodes corresponding to changes in the metadata and empty nodes corresponding to metadata inherited from temporally adjacent differential metadata, (b) a parsing module adapted to parse the metadata snapshot to determine the nodes and create an index for the metadata record to be restored by opening the one or more differential metadata and inheriting the nodes of the metadata snapshot, utilizing the index, in reverse chronological order relative to the nodes of the one or more differential metadata to determine changes between the metadata snapshot and the metadata record to be restored, and (c) a restoration engine adapted to restore a metadata record to the arbitrary time reference utilizing the determined changes.

DETAILED DESCRIPTION OF EXEMPLARY EMBODIMENTS

Figure 1:
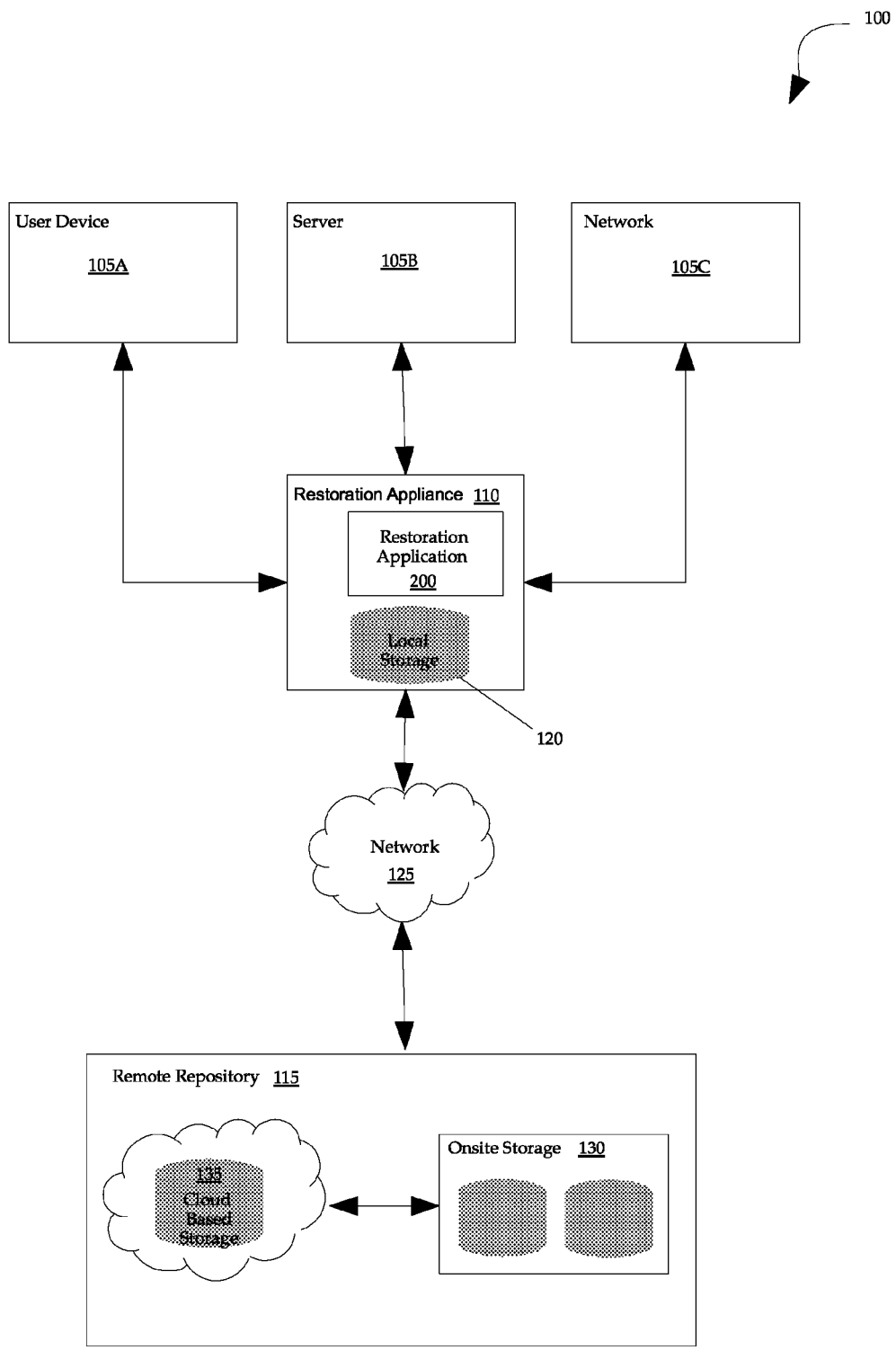
FIG. 1 is a schematic diagram of an exemplary environment for practicing the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Referring now to the drawings, and more particularly, to FIG. 1, which includes a schematic diagram of an exemplary environment 100 for practicing the present invention. Environment 100 may include a plurality of computing systems that may include one or more user devices 105A, one or more servers 105B, and one or more networks 105C, which may include a number or combination of user devices 105A and servers 105B. It will be understood that any of the aforementioned computing systems may be operatively connected to a restoration appliance 110. Any exemplary computing system is described in greater detail with reference to FIG. 7. The restoration appliance 110 is in turn, operatively connected to a remote repository 115 via a network 125. It will be understood that network may include an encrypted VPN tunnel, a LAN, a WAN, or any other commonly utilized network connection that would be known to one of ordinary skill in the art with the present disclosure before them.

Generally speaking, the restoration appliance 110 provides local backup services for files that reside on user devices 105A. The restoration appliance 110 may communicate backup files to the repository 115 and restore files remotely via repository 115. According to some embodiments, the restoration appliance 110 includes a restoration application 200 (FIG. 2) stored in memory and executable by a processor and a local storage medium 120. It will be understood that the local storage medium 120 allows files to be transferred from the remote repository 115 and stored locally before being assembled by the restoration application 200. As such, the time required to restore a file is greatly reduced relative to systems where files must be restored on the remote repository 115 and then transferred to the user device 105A.

Figure 7:
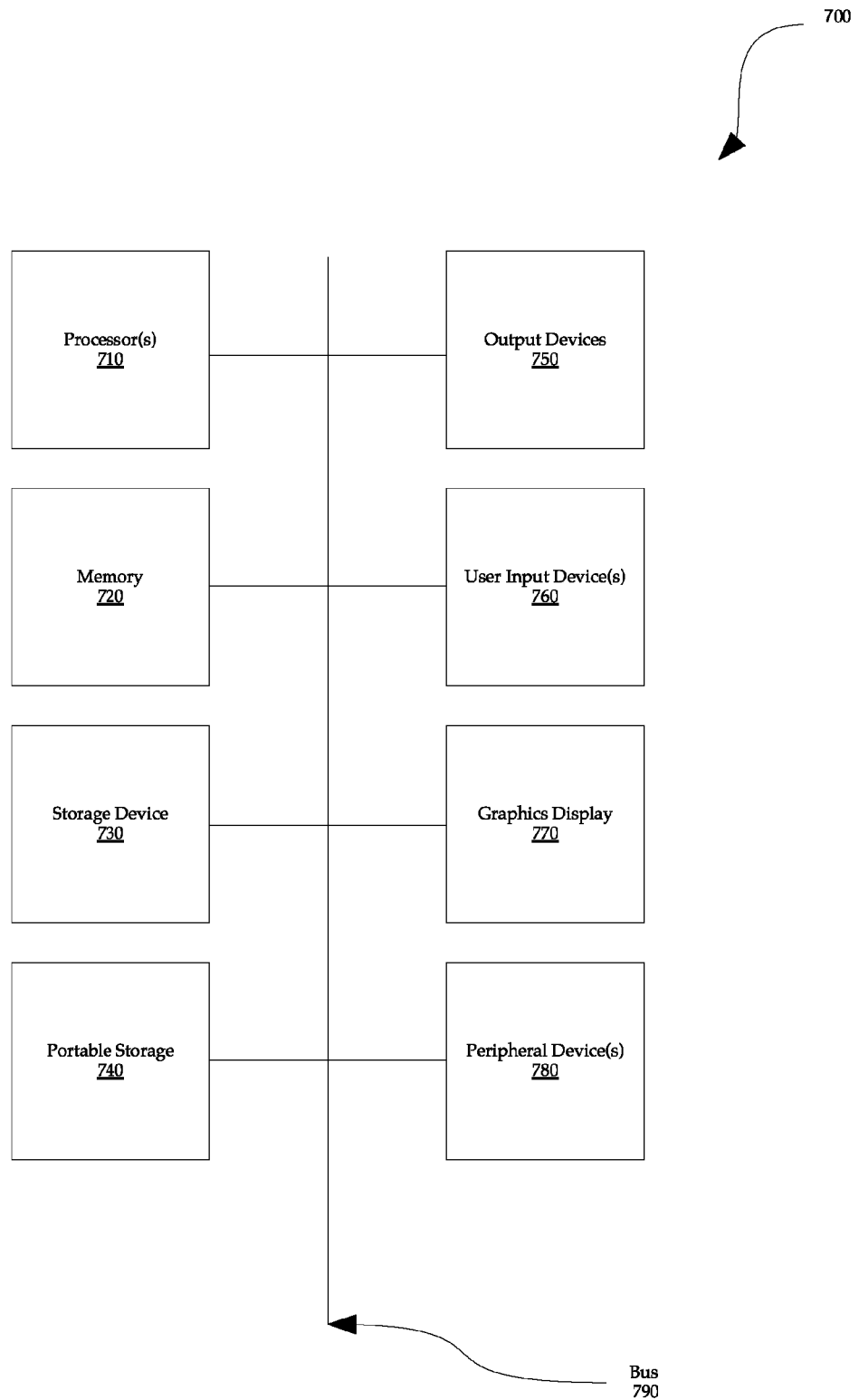
FIG. 7 illustrates an exemplary computing system that may be used to implement embodiments of the present technology.

According to some exemplary embodiments, the user devices 105A may include any number of computing systems, such as a computing system 700 as disclosed with respect to FIG. 7. The user devices 105A may also be constituent parts of an end user system (not shown) which may include, a plurality of user devices 105A that interface with one or more main servers that provide the user devices 105A with Internet access, email, FTP servers, VoIP, and the like. In some embodiments, the main servers are associated with a gateway router that connects the main servers to the network 125.

The remote repository 115 may include offsite storage in the form of collocated servers 130. It will be understood that collocated servers 130 may include servers located with a cloud 135. In greater detail, the remote repository 115 may include one or more VPN devices adapted to receive information from the gateway router of the end user systems. In some embodiments, the repository may include an Ethernet switch operatively coupling the VPN devices to a remote backup application server adapted execute at least a portion of methods for restoring files. The remote repository 115 may also include disaster recovery servers, physical media input servers, and one or more virus scanning servers.

It will be understood that the primary storage devices for the repository 115 may include, for example, RAID 5 redundant storage servers, although other types of servers that would be known to one of ordinary skill in the art with the present disclosure before them are likewise contemplated for use in accordance with the present invention.

In some embodiments, the restoration appliance 110 includes many of the same components as computing system 700 such as a memory, processor(s), data storage device(s), and the like. In accordance with the present invention, the restoration appliance 110 may be disposed locally (e.g., onsite) in relation to the user device(s) 105A associated therewith. Additionally, the restoration appliance 110 is adapted to execute a restoration application 200 that is discussed in greater detail with regards to FIG. 2.

Figure 2:
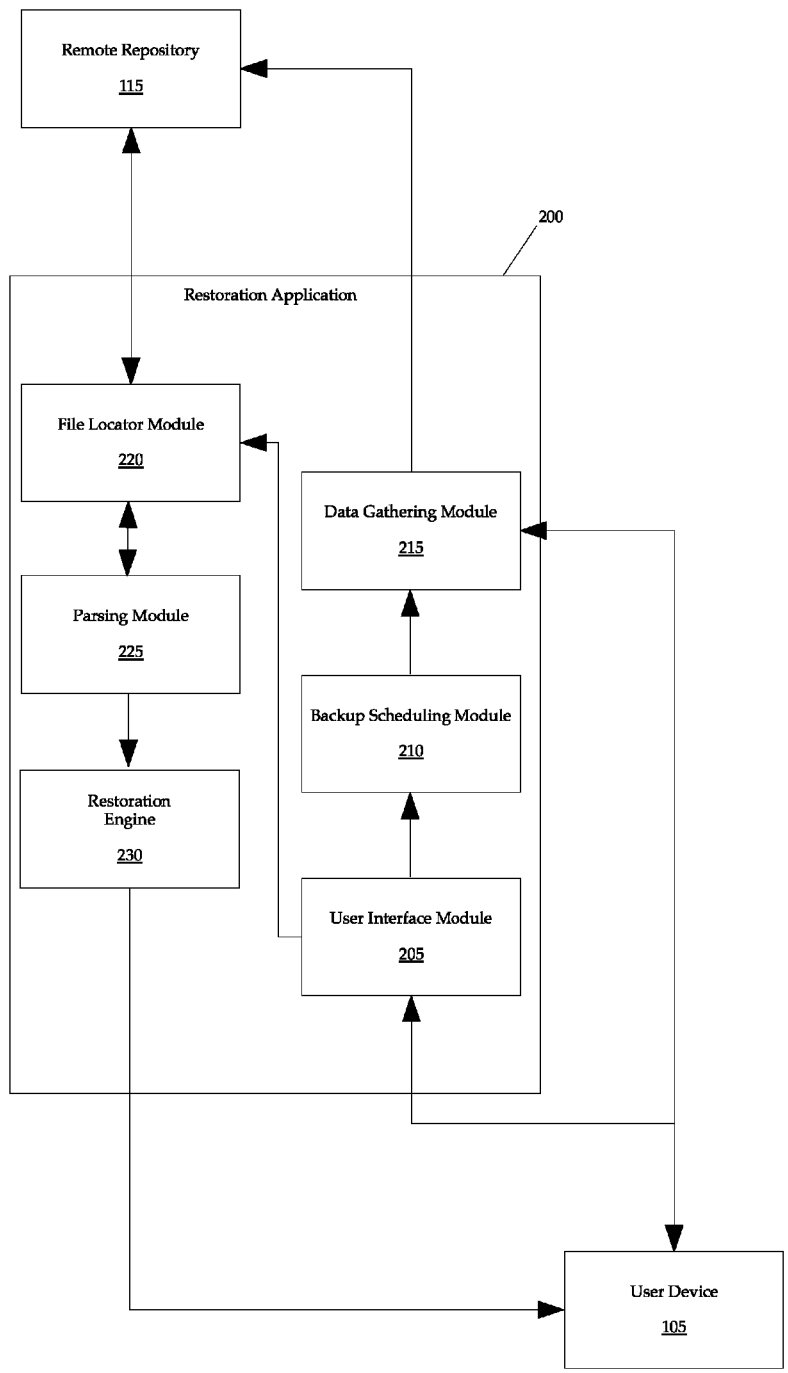
FIG. 2 is a schematic of an exemplary architecture of a restoration application for use with a restoration appliance in accordance with the present disclosure.

Referring now to FIG. 2, in some embodiments, the services provided by the restoration application 200 may be divided functionally into one or more backup functions and one or more file restoration functions. Generally, the functionalities of the restoration application 200 are accessible via a user interface module 205 that provides end users with the ability to interact with the restoration application 200. More specifically, the backup functions of the restoration application 200 may be implemented by a backup scheduling module 210 and a data gathering module 215. File restoration functions may be implemented via a file locator module 220, a parsing module 225, and a restoration engine 230.

The user interface module 205 is adapted to allow an end user to establish backup schedules that are user-defined and tailored to their needs by generating and outputting one or more user interfaces (not shown) adapted to allow an end user to input the IP address of one or more user devices that the end user would like restoration appliance 110 to perform a backup, according to a backup schedule. As such, the restoration appliance 110 is adapted to function in an agentless capacity (i.e., entirely end user defined and implemented).

The end user may also choose to perform a "basic" backup that may include predefined set of files or disks that are specified by the manufacturer of the restoration appliance 110 or remote repository 115 owner or operator, or perform an "advanced" backup that includes particular end user-defined files.

It will be understood that the in some embodiments, because the restoration appliance 110 includes a restoration application 200 that is accessible via one or more user interfaces generated by the user interface module 205, the user devices 105A may not include instructions or applications that reside locally on the user devices 105A, although in some embodiments, one or more modules or engines of the restoration application may reside on a user device 105A.

The backup scheduling module 210 receives the backup schedule and file determinations specified by the input received established via the user interface module 205 and functions to execute the creation of backups according to the user-defined schedule by executing data gathering module 215.

The data gathering module 215 is adapted to create one or more log entries indicative of the execution of the backup process for the purposes of archiving and troubleshooting failed backup or restoration attempts. Additionally, the data gathering module 215 is adapted to mount at least a portion of the remote file system of the remote repository 115 to the local storage medium 120 of the restoration appliance 110 and create a temporary storage space for the creation of the backup file. The data gathering module 215 is also configured to retrieve the blocks of data corresponding to the file to be backed up from the user device 105A and place the retrieved blocks in the temporary storage space. The data gathering module 215 is adapted to backup each file specified in the backup schedule according to the aforementioned method.

It will be understood that the blocks of data corresponding to the file to be backed up may include both a complete backup, hereinafter referred to as a "mirror" of the file which includes all blocks of data corresponding to the file, or one or more reverse incremental delta increments indicative of changes to a complete backup of the file. It will be further understood that there may be any number of reverse incremental delta increments located subsequent to a mirror.

In some embodiments, a backup schedule may be created for a particular user device 105A but applied to a plurality of user devices 105A such that the same files across the plurality of user devices 105A are similarly backed up.

Once the backups have been created and upon the occurrence of a data loss event, a file or disk may be restored by way of the restoration application 200 executing the user interface module 205 to generate and output a user interface (not shown) that is adapted to receive information indicative of the file or files to be restored along with an arbitrary time reference for restoring the file. For example, an end user may enter the particular name of a file to be restored along with an arbitrary time reference for restoring the file that precedes the data loss event. It will be understood that the arbitrary time reference may include a particular date, a range of dates, or even hour and minute data depending on the frequency with which reverse incremental delta increments were created.

Figure 3:
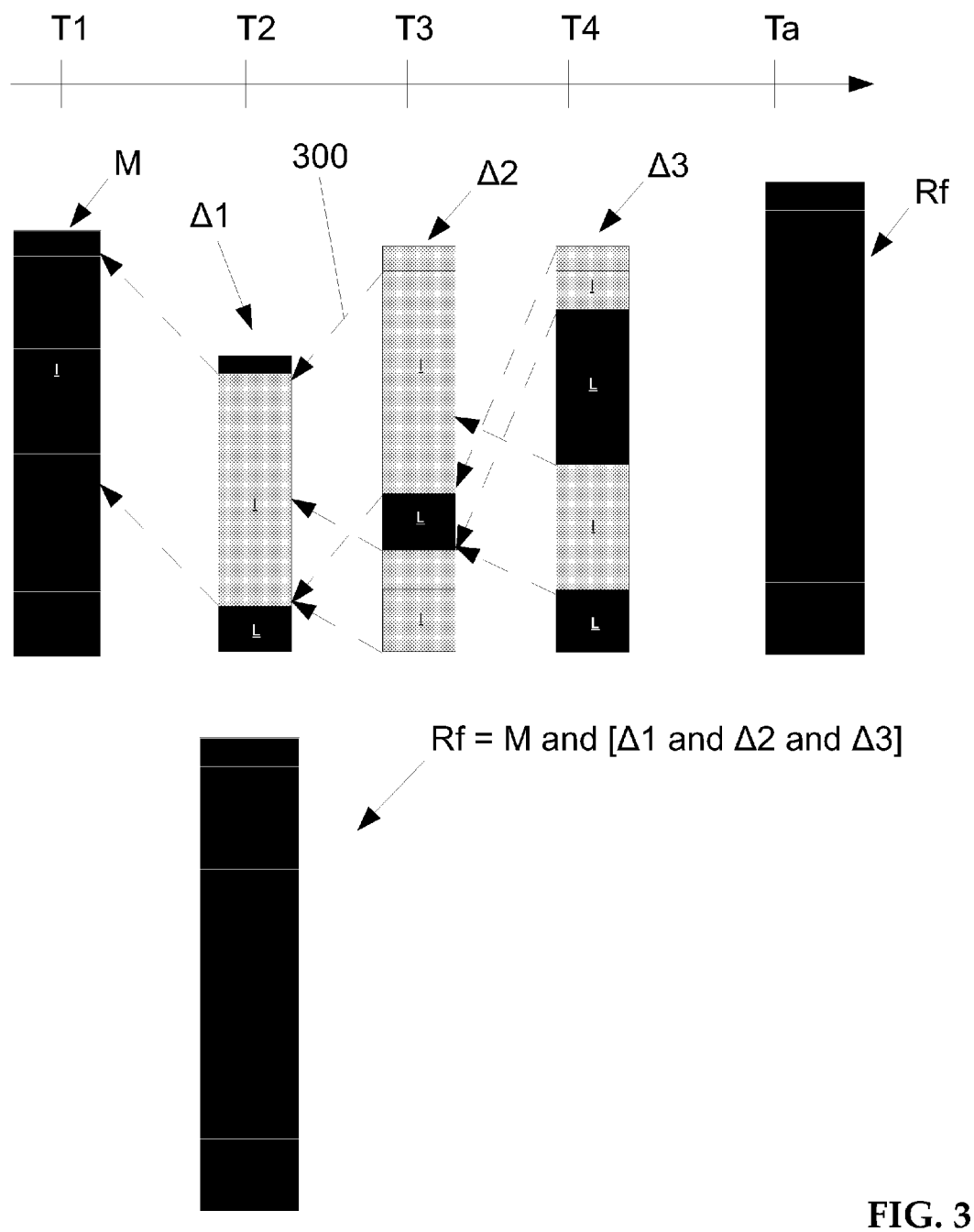
FIG. 3 is a diagrammatical representation of an exemplary method for restoring a file.

Referring now to FIGS. 2 and 3 collectively, after the end user has defined the parameters for restoring the file or files, the file locator module 220 is executed to locate a mirror M and one or more reverse incremental delta increments $\Delta 1$-$\Delta 3$ subsequent to the mirror M but preceding the arbitrary time reference corresponding to the input received. The creation dates of the mirror M and reverse incremental delta increments $\Delta 1$-$\Delta 3$ are represented by the timeline T1-T4. It will be understood that the file locator module 220 is adapted to locate the closest temporally adjacent reverse incremental delta increment, also known as the prime increment, to the desired arbitrary file date. In this instance the prime increment would be $\Delta 3$. It will further be understood that the closest temporally adjacent reverse incremental delta increment may depend on the frequency with which reverse incremental delta increments are created. For example, it is more likely that the file locator module 220 may locate a reverse incremental delta increment nearly synchronous to the arbitrary date if reverse incremental delta increments are created several times per day. The file locator module 220 is adapted to communicate with both the local storage device 120 (FIG. 1) on the restoration appliance 110 and the remote repository 115 to locate the requested files.

Once the file locator module 220 locates the mirror M and one or more reverse incremental delta increments $\Delta 1$-$\Delta 3$, the parsing module 225 is executed to open both the mirror M, the prime increment $\Delta 3$, and one or more of the reverse incremental delta increments disposed therebetween $\Delta 1$-$\Delta 2$, substantially simultaneously. The parsing module 225 evaluates the blocks present within each of the located data sets. Generally speaking, the mirror M and reverse incremental delta increments $\Delta 1$-$\Delta 3$ contain all pertinent data corresponding to the file or disk to be restored Rf. The reverse incremental delta increments are data sets indicative of changes to the mirror M that include both literal block L and inherited blocks I. It will be understood that the literal blocks L are indicative of data that has changed since the creation of a temporally adjacent reverse incremental delta increment, or in some instances, the mirror M such as when the literal blocks L correspond to a reverse incremental delta increment that is temporally adjacent to the mirror M. The inherited blocks I include data that has not been modified relative to the mirror M and may include only metadata indicative of the offset and length of data to be copied from the mirror M. Therefore, to create a copy of the file the parsing module 225 may parse each reverse incremental delta increment $\Delta 1$-$\Delta 3$ to determine the offsets and lengths of the inherited blocks I. Once the offsets and lengths of the inherited blocks I have been determined by the parsing module 225, the restoration engine 230 is executed to copies or "inherits" the inherited blocks I from the inherited blocks I backwards in time towards the mirror M and combines the inherited blocks I copied backwards through time with the literal blocks L to assemble the restored file Rf.

According to some embodiments, the parsing module 225 may be adapted to allow for set of opened reverse incremental delta increments set in an array of increment handles prior to determining the offsets and lengths of the inherited blocks I.

It will be understood that several reverse incremental delta increments $\Delta 1$-$\Delta 3$ may exist between the mirror M and the restored file Rf. Rather than iteratively creating temporary files for each of the reverse incremental delta increments $\Delta 1$-$\Delta 3$, the parsing module 225 is adapted to open each of the reverse incremental delta increments $\Delta 1$-$\Delta 3$ and the mirror M, substantially simultaneously to determine the offsets and lengths of each of the literal L and inherited I blocks thereof. The parsing module 225 may utilize any number of commonly known data structures for parsing data, including, but not limited to binary search tree, that would be known to one of ordinary skill in the art with the present disclosure before them.

It will be understood that in some embodiments, rather than simple naive linear parsing of the reverse incremental delta increments $\Delta 1$-$\Delta 3$, the parsing module 225 may be adapted to generate sparse run-time indices of the reverse incremental delta increments $\Delta 1$-$\Delta 3$ transparent to the process of evaluating the restored file Rf. It will be understood that in some embodiments, the indices are not persistently stored, but rather are generated at run-time and are stored in memory to reduce seeks in subsequent executions and increase the efficiency of the process. In additional embodiments, these sparse indices may be stored in non-volatile space, for example, an index that resides locally or remotely.

The parsing module 225 may analyze each of the reverse incremental delta increments Δ1-Δ3 in reverse chronological order (e.g., T4 towards T1) and inherit or copy the inherited blocks I backwards in time through each of the reverse incremental delta increments Δ1-Δ3 until a literal block L is reached. It will be understood that if the inheritance is not fulfilled via literal blocks L in one or more of the intermediate delta increments or snapshot increments, then the inheritance will continue until reaching the mirror M. Dotted lines 300 are illustrative of the process of inheritance (or tracing) of inherited I blocks of temporally adjacent reverse incremental delta increments Δ1-Δ3 through time.

The restoration module 230 receives the parsed data from the parsing module 225 and assembles the blocks according to the established run-time indices to generate the restored file Rf.

It will be understood that in some embodiments the parsing module 225 may be adapted to process unresolved blocks of data that may be utilized by the restoration module 230 to assemble, for example, a reverse incremental delta increment. Allowing the parsing module 225 to process unresolved blocks allows the restoration module 230 to assemble single reverse incremental delta increments that are representative of a plurality of reverse incremental delta increments. This functionality is particularly suited to minimize the use of storage space on either the local restoration appliance 110 or the remote repository 115 as the plurality of reverse incremental delta increments represented by the single reverse incremental delta increment may be deleted from the storage device.

More specifically, the parsing module 225 may be adapted to permit an incomplete mapping of the one or more reverse incremental delta increments Δ1-Δ3 by evaluating one or more unresolved inherited blocks I. It will be understood that in some embodiments, the parsing module 225 may not permit an incomplete mapping of one or more reverse incremental delta increments Δ1-Δ3. As such, the parsing module 225 may be adapted to terminate mapping of the one or more reverse incremental delta increments Δ1-Δ3 upon locating an unresolved inherited block I of data.

Figure 4:
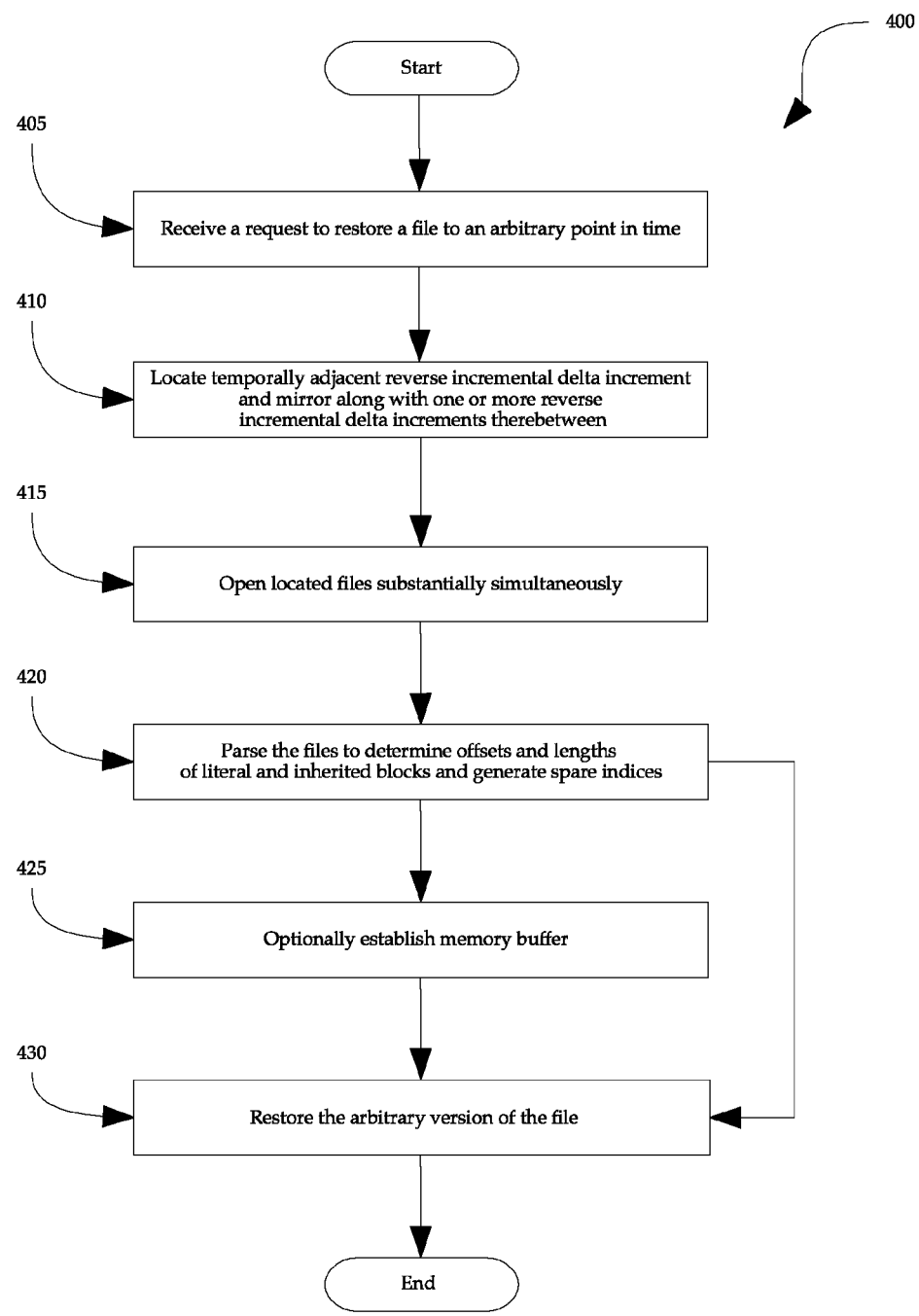
FIG. 4 is a flowchart of an exemplary method for restoring a file.

Referring now to FIG. 4, a method 400 for restoring a file is initiated by the user interface module 405 receiving a request to restore a file. It will be understood that the request to restore a file includes information indicative of the file to be restored along with an arbitrary date indicative of the data at which the file should be restored. It will be understood that the end user may specify the location at which the restored file should be placed (e.g., the computing system of the end user).

Utilizing the request, in step 410 the file locator module locates the nearest temporally adjacent reverse incremental delta increment preceding the arbitrary time reference (e.g., prime increment) along with the nearest mirror preceding the arbitrary time reference. The file locator module also locates any additional reverse incremental delta increments distributed between the mirror and the prime increment.

Once located, in step 415 the parsing module opens each of the located data sets substantially simultaneously and in step 420 parses each of the reverse incremental delta increments to determine the offsets and lengths of the literal and inherited blocks thereof to establish run-time indices that are indicative of the data sets.

In an optional step 425, the restoration engine may establish a temporary space on the local storage medium of the restoration appliance for receiving the restored file. In additional embodiments, the file is restored directly to the computing system of the end user, thereby skipping optional step 425.

Next in step 430, the restoration module inherits each of the inherited blocks in reverse chronological order and combines the inherited blocks along the literal blocks of each of the reverse incremental delta increments to assemble the restored file at the arbitrary time reference corresponding to the input received by the file locator module. The restored file may be stored in the space allocated on the local storage medium in step 425.

Figure 5:
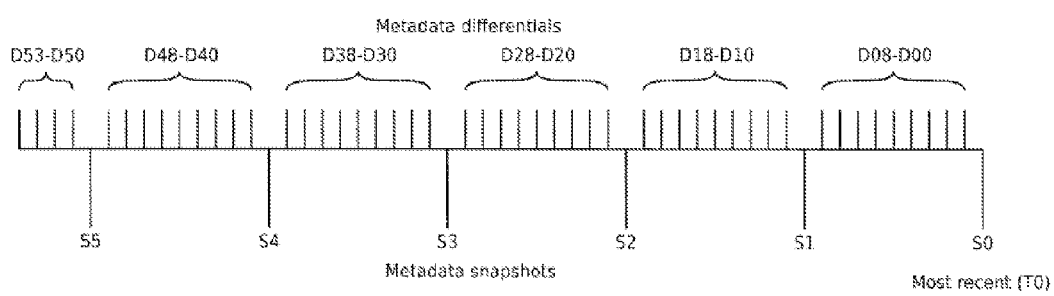
FIG. 5 is a diagrammatical representation of a backup schedule that includes metadata snapshots and differential metadata files.

Referring back to FIGS. 2 and 5 collectively, in some embodiments, the application 200 is adapted to restore a metadata record from one or more differential metadata records. In such embodiments, the application 200 is configured to restore full metadata snapshots from individual differential metadata records or restore differential metadata files utilizing metadata snapshots.

Generally speaking, with reference to processes for backing up and restoring files, a metadata snapshot includes an ordered and complete record of all metadata for all nodes present in a particular mirror. A differential metadata record includes an ordered and partial record of all nodes different from the immediately preceding metadata snapshot. It will be understood that some nodes of a differential metadata record are absent and may be referred to as "null" nodes. Null nodes are representative of nodes introduced in a subsequent differential metadata record that are not present in the instant metadata snapshot and will be discussed in greater detail herein. The use of null nodes prevents the reverse inheritance of these nodes, which would lead to erroneous metadata backups.

Therefore, the application 200 is adapted to backup and restore metadata records which may be utilized to backup or restore files in conjunction with the methods described above for restoring a file.

It will be understood that prior to restoring a metadata record, metadata snapshot records are created at predetermined intervals that in some instances may vary according to the backup schedule established by an end user as described above with regards to the method for restoring a file. Moreover, changes to the metadata snapshot records are stored as differential metadata files and may be stored at predetermine intervals. For example, for every nine differential metadata files created, a new metadata snapshot record may be created.

According to some embodiments, a metadata record may be restored to an arbitrary time reference by executing the file locator module 220 to locate a metadata snapshot, which in this case is represented by a metadata snapshot S0 subsequent to the arbitrary time reference represented by S1. The file locator module 220 then locates all differential metadata records intervening between the arbitrary time reference and the metadata snapshot S0, for example D08-D00.

According to some embodiments, the file locator module 220 is adapted to order the file handles of the metadata snapshot S0 and the differential metadata records D08-D00 in reverse chronological order. The metadata snapshot S1 is placed at the end of the array and is utilized to determine the threshold for determining and end point for analyzing the nodes of the metadata snapshot S0 and the differential metadata records D08-D00.

The parsing module 225 evaluates each node present in the first metadata S0 to generate an index that is utilized to inherit nodes in reverse chronological order back through each of the differential metadata records D08-D00.

Utilizing the index, the parsing module 225 opens each differential metadata file and iterates through each of the nodes present in the metadata snapshot S0. For each node present in the metadata snapshot S0, the parsing module 225 iterates in reverse chronological order through each of the differential metadata records beginning with D00 through D08. The node currently being iterated by the parsing module 225 may be made available for inheritance through to previous differential metadata records. It will be understood that inheritance of a particular node may be deferred by the parsing module 225 if the next node in a preceding differential metadata record occurs before the node that is currently being iterated by the parsing module 225. Moreover, upon encountering such a node, the parsing module 225 may be adapted to defer the iteration by recursing unto the differential metadata record being iterated until the recursion meets or exceeds the node currently being inherited, or until all nodes in the currently being iterated differential metadata record have been processed.

In some embodiments, the application 200 may be adapted to synthesize a differential metadata record from two or more metadata snapshots. According to some embodiments, a differential metadata record may be synthesized for a particular metadata snapshot record by executing the file locator module 220 (such as metadata snapshot record S1). To synthesize differential metadata records corresponding to a first metadata snapshot S1 a subsequent metadata snapshot record must be located such as a second metadata snapshot S0 indicative of the most current metadata snapshot. It will be understood that in this example a differential metadata file may not be synthesized for the most current metadata snapshot record, as no differential metadata snapshot records exist subsequent to the second metadata snapshot S0.

The file locator module 220 then locates all intervening differential metadata records D08-D00 indicative of changes to the metadata subsequent to first metadata snapshot S1 and preceding the second metadata snapshot S0.

The parsing module 225 iterative and recursively parses the nodes of the located metadata records S0, S1 and D08-D00 as described above, although it will further be understood that the parsing module 225 may be adapted to parse the metadata records differently depending to whether the record currently being iterated is a metadata snapshot record or a differential metadata record. That is, if the metadata record currently being iterated is a differential metadata record, the data represented thereby is inherently differential such that the inherited nodes of the differential metadata record may be ignored by the parsing module 225. In contrast, if the metadata record currently being iterated is a metadata snapshot record, the nodes of the second metadata snapshot S0 must be evaluated before the nodes may be applied as a synthesized differential metadata record of the first metadata snapshot S1. If it is determined that one or more iterated nodes are unaligned for example, between the second metadata snapshot S0 and the first metadata snapshot S1, the parsing module 225 is adapted to generate a null metadata entry for the node currently being inherited to indicate the absence of the node currently being inherited in the second metadata snapshot S0. It will be understood that the node currently being inherited may be applied as a differential metadata record if the node occurs before the aligned node of the first metadata snapshot S1 for which the metadata is being synthesized.

In some embodiments, differential metadata records may be synthesized across a wide range of metadata snapshot records, for example across metadata snapshot records S0-S5 according to the methods described above, although it will be understood that the process may include parsing through metadata snapshot records S0-S5 by first segmenting the metadata snapshot records S5 to S4, S4 to S3, and the like. In this example, the metadata snapshot record S5 is utilized as the basis for inheritance for the iterative process. The subsequent metadata snapshot record S4 is applied as a differential metadata record in the instant synthesis, and then is utilized by the parsing module 225 as a suppressed metadata snapshot record (e.g., including null records) for inheritance in the next synthesis between S4 and S3.

Figure 6:
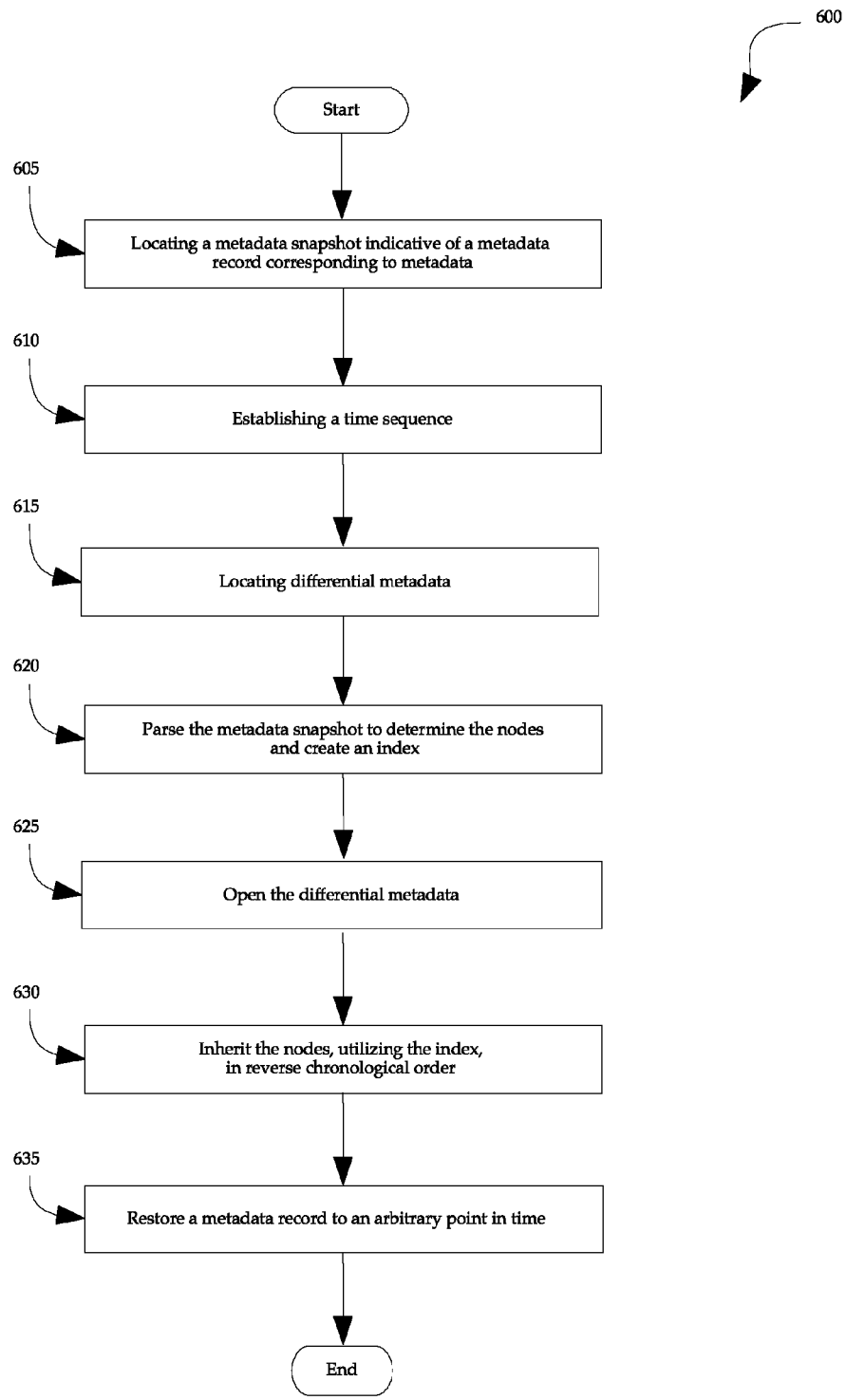
FIG. 6 is a flowchart of an exemplary method for restoring a metadata file.

Referring now to FIG. 6, a method 600 for restoring a metadata record from differential metadata is shown as comprising a plurality of steps. In some embodiments, the method 600 includes step 605 of the file locator module identifying a metadata snapshot associated with the metadata record to be restored, the metadata snapshot including plurality of nodes corresponding to metadata.

In step 610, the file locator module is adapted to establish a time sequence spanning between a first time reference and a second time reference of the metadata snapshot. It will be understood that the first time reference may be an arbitrary time reference corresponding to a time reference to which the metadata record may be restored. Once a time sequence has been established, in step 615 the file locator module locates differential metadata created during the time sequence established in step 610. It will be understood that the differential metadata includes nodes corresponding to changes in the metadata and empty nodes corresponding to metadata inherited from temporally adjacent differential metadata.

Next, in step 620, the parsing module is adapted to parse the metadata snapshot to determine the nodes and create an index for the metadata record to be restored. According to some embodiments, parsing may include iteratively parsing the nodes of a metadata snapshot located by the file locator module in step 605.

After parsing the nodes of the located metadata snapshot, in step 625, the parsing module is adapted to open the one or more differential metadata records located by the file locator module in step 605. It will be understood that in some embodiments, the parsing module is adapted to open each of the one or more differential metadata records substantially simultaneously.

Next, in step 630, the parsing module inherits the nodes of the metadata snapshot, utilizing the index, in reverse chronological order relative to the nodes of the one or more differential metadata records to determine changes between the metadata snapshot and the metadata record to be restored.

Lastly, at step 635, the restoration engine is adapted to restore a metadata record to the arbitrary time reference utilizing the changes between the metadata snapshot and the metadata record to be restored as determined by the parsing module in step 630.

FIG. 7 illustrates an exemplary computing system 700 that may be used to implement an embodiment of the present technology. The system 700 of FIG. 7 may be implemented in the contexts of the likes of user devices 105A, such as computing systems, networks, servers, or combinations thereof. The computing system 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 may store the system software for implementing embodiments of the present invention for purposes of loading that software into main memory 720.

Portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alphanumeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. Peripheral device(s) 780 may include a modem or a router.

The components provided in the computer system 700 of FIG. 7 are those typically found in computer systems that may be suitable for use with embodiments of the present invention and are intended to represent a broad category of such computer components that are well known in the art. Thus, the computer system 700 of FIG. 7 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for restoring a file, the method comprising:
receiving a time reference;
locating a nearest mirror that is previous to the time reference, the nearest mirror including all blocks of data corresponding to the file at a time previous to the time reference;
locating all intervening delta increments between the time reference and the nearest mirror, the intervening delta increments including both inherited blocks of data and literal blocks of data, the inherited blocks of data including:
data that has not changed relative to a temporally previous delta increment, or
data that has not changed since the creation of the nearest mirror when the delta increment is temporally adjacent to the nearest mirror,
the literal blocks of data indicative of:
data that has changed since the creation of a temporally adjacent delta increment, or
data that has changed since the creation of the nearest mirror when the delta increment is temporally adjacent to the nearest mirror;
opening the located intervening delta increments such that all intervening delta increments are open at the same time;
determining offsets and lengths for both the inherited blocks and the literal blocks in each of the opened intervening delta increments, while all intervening delta increments are open;
analyzing each of the intervening delta increments in reverse chronological order beginning with the intervening delta increment temporally adjacent to the time reference, while all intervening delta increments are open;
inheriting the inherited blocks in reverse chronological order based on the analysis of each of the delta increments in turn, until encountering a literal block in either an intervening delta increment or the nearest mirror, while all intervening delta increments are open; and
copying the encountered literal block into a restored file.

2. The method of claim 1, wherein the inherited blocks of data include only metadata indicative of an offset and length of data to be copied from the nearest mirror or a previous delta increment.

3. The method of claim 1, further comprising:
generating sparse run-time indices of the opened intervening delta increments at run-time based on the analysis of each of the delta increments; and
storing the generated sparse run-time indices in memory.

4. The method of claim 3, wherein the generated sparse run-time indices are stored in non-volatile memory.

5. The method of claim 3, wherein parsing further comprises deferring inheritance of a particular node if the next node in a preceding differential metadata record occurs before the node that is currently being iterated.

6. The method of claim 3, further comprising generating the restored file from blocks assembled according to the run-time indices.

7. The method of claim 1, further comprising arranging the opened intervening delta increments in an array of incremental file handles prior to determining the offsets and the lengths of the inherited blocks.

8. The method of claim 7, further comprising ordering the file handles in reverse chronological order.

9. A system for restoring a file at an arbitrary time reference preceding a data loss event, the system comprising:
　a file locator module configured for identifying:
　　a mirror that is a complete backup of the file at a time before the arbitrary time reference,
　　a plurality of reverse incremental delta increments indicative of changes to the mirror subsequent to the mirror and preceding the arbitrary time reference, the reverse incremental delta increments including:
　　　literal blocks each comprising an indication of data that has changed since creation of a preceding temporally adjacent reverse incremental delta increment, and
　　　inherited blocks each comprising metadata indicating an offset and a length of a block of data that has not been modified relative to the mirror, and
　　a prime delta increment being a reverse incremental delta increment of the plurality of reverse incremental delta increments that is temporally adjacent to the arbitrary time reference;
　a parsing module configured for:
　　opening the mirror,
　　opening the plurality of the reverse incremental delta increments such that they are all open at the same time as the mirror,
　　evaluating the open reverse incremental delta increments and the mirror in reverse chronological order for blocks of data comprising the literal blocks and the inherited blocks, and
　　determining offsets and lengths of each of the inherited and the literal blocks; and
　a restoration module for:
　　receiving the parsed data from the parsing module,
　　assembling a single representative reverse incremental delta increment that represents the plurality of open reverse incremental delta increments,
　　deleting the plurality of reverse incremental delta increments represented by the single representative reverse incremental delta increment, and
　　restoring the file from the mirror and the single representative reverse incremental delta increment.

10. The system of claim 9, wherein assembling the single representative reverse incremental delta increment comprises:
　inheriting each of the inherited blocks in reverse chronological order backwards in time towards the mirror; and
　combining the literal blocks of data with the inherited blocks of data.

11. The system of claim 9, wherein the restoration module is further configured for:
　processing unresolved blocks of data; and
　assembling the single representative reverse incremental delta increment using the processed unresolved blocks of data.

12. The system of claim 9, wherein the parsing module is further configured for:
　generating sparse run-time indices of the plurality of the reverse incremental delta increments; and
　storing the sparse run-time indices.

13. The system of claim 12, wherein the restoration module is further configured for:
　assembling the literal and the inherited blocks according to the sparse run-time indices; and
　generating a restored file from the assembled blocks.

14. The system of claim 9, wherein the parsing module is further configured for:
　using the determined offsets and lengths of the literal and the inherited blocks to generate sparse run-time indices that are indicative of the open reverse incremental delta increments; and
　storing the sparse run-time indices in non-volatile memory.

15. The system of claim 9, wherein the parsing module is further configured for:
　generating sparse run-time indices of the plurality of the reverse incremental delta increments at run-time; and
　storing the sparse run-time indices in non-volatile memory.

16. A method for generating a restored file at an arbitrary time reference, the method comprising:
　locating all intervening incremental delta increments between the arbitrary time reference and a mirror of the file to be restored, the mirror including all blocks of data corresponding to the file to be restored, the intervening incremental delta increments including both inherited blocks of data and literal blocks of data;
　after locating all intervening incremental delta increments, opening the located intervening incremental delta increments and the mirror such that all intervening incremental delta increments are open at the same time as the mirror;
　after opening all the located intervening incremental delta increments and the mirror, analyzing each of the intervening incremental delta increments and the mirror in turn in reverse chronological order while the mirror and all intervening incremental delta increments are open;
　after analyzing the intervening incremental delta increments and the mirror, identifying locations of the inherited and the literal blocks of data in the open intervening incremental delta increments and the mirror that are to be copied into the restored file based on the analysis; and
　after identifying all the locations of the inherited and the literal blocks of data, copying the identified inherited and the identified literal blocks of data from the identified locations into the restored file.

17. The method of claim 16, further comprising:
　generating sparse run-time indices of the opened intervening incremental delta increments at run-time based on the analysis of each of the intervening incremental delta increments; and
　storing the generated sparse run-time indices in non-volatile memory.

18. The method of claim 16, wherein analyzing each of the intervening incremental delta increments in turn in reverse chronological order includes beginning with the intervening incremental delta increment temporally adjacent to the time reference and ending with the mirror.

19. The method of claim 16, wherein the identified locations of the blocks of data include offsets and lengths.

20. The method of claim 16, wherein:
　the inherited blocks of data include:
　　data that has not changed relative to a temporally previous delta increment, or data that has not changed since the creation of the mirror when the delta increment is temporally adjacent to the mirror; and the literal blocks of data are indicative of:

data that has changed since the creation of a temporally adjacent delta increment, or data that has changed since the creation of the mirror when the delta increment is temporally adjacent to the mirror.

\* \* \* \* \*